United States Patent
Sylvain

(10) Patent No.: US 8,104,784 B2
(45) Date of Patent: Jan. 31, 2012

(54) HORIZONTAL LAMINATED SKI CONSTRUCTION

(75) Inventor: François Sylvain, Sainte-Anne-de-Beaupré (CA)

(73) Assignee: K-2 Corporation, Seattle, WA (US)

( * ) Notice: Subject to any disclaimer, the term of this patent is extended or adjusted under 35 U.S.C. 154(b) by 247 days.

(21) Appl. No.: 12/352,519

(22) Filed: Jan. 12, 2009

(65) Prior Publication Data

US 2009/0179402 A1      Jul. 16, 2009

Related U.S. Application Data

(60) Provisional application No. 61/020,353, filed on Jan. 10, 2008.

(51) Int. Cl.
    *A63C 5/14* (2006.01)
(52) U.S. Cl. .................................. 280/610; 280/609
(58) Field of Classification Search .............. 280/609, 280/610, 14.22, 87.042
    See application file for complete search history.

(56) References Cited

U.S. PATENT DOCUMENTS

| | | | |
|---|---|---|---|
| 3,635,483 A * | 1/1972 | Barriball et al. ............. 280/610 |
| 3,652,102 A * | 3/1972 | Eaton ............................ 280/610 |
| 3,705,729 A * | 12/1972 | Arnsteiner .................... 280/610 |
| 3,733,380 A * | 5/1973 | Ishida ........................... 264/46.5 |
| 3,740,301 A * | 6/1973 | Manning et al. .............. 428/112 |
| 4,094,528 A * | 6/1978 | Cluzel ........................... 280/610 |
| 4,313,614 A * | 2/1982 | Woitschatzke et al. ....... 280/610 |
| 4,523,772 A | 6/1985 | Arnsteiner |
| 4,706,985 A | 11/1987 | Meatto |
| 5,238,260 A | 8/1993 | Scherübl |
| 5,573,264 A | 11/1996 | Deville |
| 5,649,717 A | 7/1997 | Augustine |
| 5,759,664 A * | 6/1998 | Chisnell et al. ............... 428/109 |
| 5,769,445 A | 6/1998 | Morrow |
| 5,984,343 A | 11/1999 | Longoni |
| 6,105,991 A | 8/2000 | Dodge |
| 6,182,986 B1 * | 2/2001 | Smith ...................... 280/87.042 |
| 6,382,658 B1 | 5/2002 | Stubblefield |
| 6,402,182 B1 * | 6/2002 | Noviant ........................ 280/610 |
| 6,406,054 B1 * | 6/2002 | Huyghe ........................ 280/610 |
| 6,502,850 B1 | 1/2003 | Schaller |
| 6,520,530 B1 | 2/2003 | Dodge |
| 6,527,284 B2 * | 3/2003 | Bert ......................... 280/87.041 |
| 7,275,755 B2 * | 10/2007 | Marion ......................... 280/602 |
| 7,506,880 B2 * | 3/2009 | Burwell .................... 280/87.042 |
| 7,735,844 B2 * | 6/2010 | Gallo ....................... 280/87.042 |
| 2001/0040356 A1 * | 11/2001 | Madrid ......................... 280/609 |
| 2005/0077704 A1 * | 4/2005 | Guex et al. .................... 280/610 |
| 2007/0252362 A1 * | 11/2007 | Burwell ........................ 280/610 |
| 2009/0179402 A1 * | 7/2009 | Sylvain ......................... 280/610 |

* cited by examiner

*Primary Examiner* — Jeffrey J Restifo
(74) *Attorney, Agent, or Firm* — Christensen O'Connor Johnson Kindness PLLC

(57) ABSTRACT

A core assembly for a gliding board such as a ski or a snowboard. The core assembly includes a plurality of horizontal layers that are sized to various desired lengths, positioned to achieve a desired thickness profile, and laminated. A method of making a core assembly for a gliding board.

18 Claims, 2 Drawing Sheets

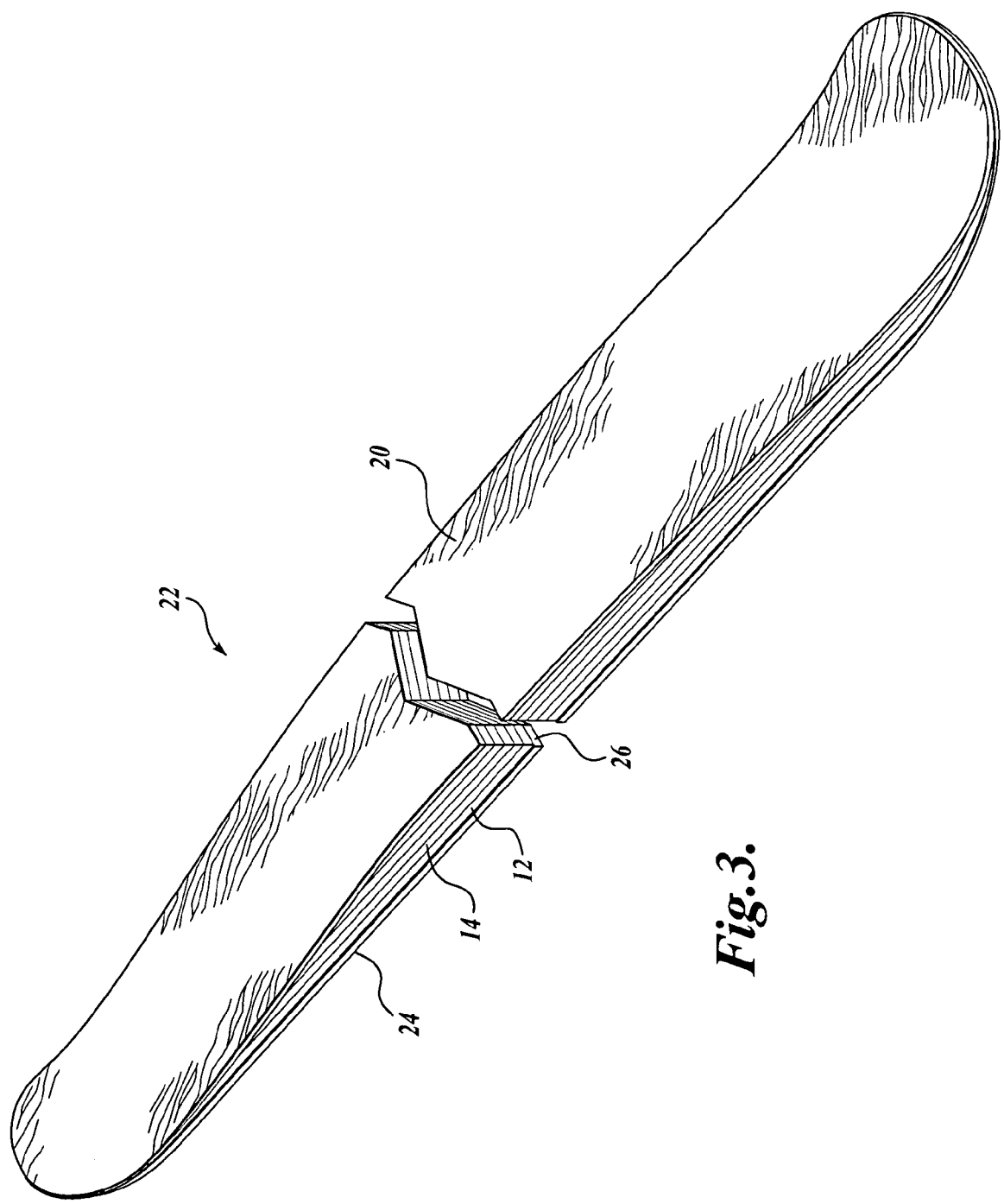

HORIZONTAL LAMINATED SKI CONSTRUCTION

CROSS-REFERENCE TO RELATED APPLICATION

This application claims the benefit of U.S. Provisional Application No. 61/020,353, filed Jan. 10, 2008, the disclosure of which is hereby expressly incorporated by reference in its entirety.

BACKGROUND

Skiing, snowboarding and other gliding-board snow sports are popular throughout the world, and new enthusiasts continue to innovate in the way such sports are practiced. For example, recent innovations in skiing techniques include the performance of difficult tricks while on the skis that reflect tricks that are frequently undertaken in wheeled sports such as inline skating, skateboarding, and the like, and sometimes by snowboarders.

A new alpine skiing sport, sometimes called "newschool skiing" originated in the late 1990s, when freestyle skiers began attempting and performing tricks in what were at the time snowboard-only terrain parks. Newschool skiing is related more to snowboarding in general style than to traditional freestyle skiing.

Many ski resorts have introduced terrain parks for skiers and snowboarders to perform tricks. These parks may include, for example, rails, boxes, jumps, hips, quarterpipes, and halfpipes.

A popular choice of equipment for this terrain is the twin-tip ski, which is turned up at both ends to allow for both regular (forwards) and fakie (backwards) skiing. Three common types of newschool skis are powder, all-mountain, and park. The powder ski is wide and sometimes has a higher tail in order to support switch powder landings. The all-mountain ski is an average width and is equally good on both groomed and powder. The park ski is specially built for "jibbing" (i.e., skiing on anything other than snow such as rails, boxes, barrels, walls, etc.) and jumps. Park skis are often designed with a more symmetrical shape to make fakie skiing much easier and with reinforced edges to withstand rails.

Many of the tricks associated with newschool skiing produce significant stresses and/or abrasions to the skis that are not common in other skiing forms. Conventional ski construction methods are typically directed to more conventional forms of skiing. Newschool skiing can result in damage and even breakage of conventional skis.

Moreover, youths especially are attracted to terrain parks and are continually looking for more challenging and unique features. They also participate in summer action sports that utilize similar structures in skate parks and urban terrain. For this reason much of the man-made park features mimic terrain normally found in the city and in skate parks. Enthusiasts are using skis in urban terrain, often with very little, if any, snow. When performing tricks in these conditions, the skis get damaged more quickly. Typically, warranties do not cover the impact damage caused by such endeavors. For this reason, users often find it more difficult to afford to participate in the sport, due to the high price of buying replacement equipment.

Similarly, snowboarding enthusiasts are famous for pushing the envelope in finding new and innovative methods and practices in their sport. Often such practices are very dynamic and can put unanticipated strains and stresses on the snowboards, potentially resulting in damage to the snowboard equipment.

It would be advantageous, therefore, to produce a gliding board suitable for newschool skiing, snowboarding, and/or similar gliding board sports that is both rugged to withstand the rigors of such uses and is relatively inexpensive to produce.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, the invention relates to a core assembly for a gliding board. The core assembly includes a plurality of horizontal layers that are sized to various desired lengths, positioned to achieve a desired thickness profile, and laminated.

In one embodiment, the horizontal layers are formed of wood.

In one embodiment, the horizontal layers are formed of an anisotropic composite material. In one embodiment, the anisotropic composite material is fiberglass, carbon-fiber composite, or para-aramid synthetic fiber composite material.

In one embodiment, the horizontal layers are sized and positioned to produce a thicker profile where strength and stiffness are desired in the core assembly. In one embodiment, the horizontal layers are sized and positioned to produce a thinner profile where flexibility is desired in the core assembly. In one embodiment, the desired thickness profile is thicker in the longitudinal center of the core assembly than at the tips of the core assembly.

In one embodiment, the core assembly has a top sheet that is positioned on top of the core assembly and extends the length of the core assembly.

In one embodiment, the core assembly has a base member that is positioned underneath the core assembly and extends the length of the core assembly. In one embodiment, the base member has metal edges.

In one aspect, the invention relates to a method of making a core assembly for a gliding board. The method includes (a) providing a base member having a desired plan form shape;

(b) providing a plurality of horizontal layers that are sized to various desired lengths; and (c) positioning the horizontal layers on the base member to produce a desired thickness profile.

In one embodiment, metal edges are attached to the base member.

In one embodiment, the horizontal layers are formed of wood.

In one embodiment, the horizontal layers are formed of an anisotropic composite material.

In one embodiment, a top sheet is positioned over the top of the core assembly and extends the length of the core assembly.

In one embodiment, the base member, horizontal layers, and top sheet are fixably attached to each other by applying an adhesive and pressing the base member, horizontal layers, and top sheet together until the adhesive has cured. In one embodiment, the adhesive is an epoxy resin.

In one embodiment, the horizontal layers and top sheet are trimmed to match the plan form shape of the base member.

In one embodiment, the horizontal layers are pieces of rectangular veneer that are about 5 inches wide and about 0.063 inches thick. In one embodiment, the pieces of rectangular veneer are laminated with a grain orientation alternating between 0° and 90° to the major axis of the ski in adjacent layers.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3 shows a twin-tip ski utilizing the ski core shown in FIG. 2.

DETAILED DESCRIPTION

An exemplary embodiment of a ski core/ski assembly, and a method of making the ski assembly, are described herein with reference to the figures, wherein like numbers indicate like parts. The disclosed method is illustrated with reference to a ski assembly, but it will be readily apparent that the method may also be used for other gliding boards, for example, snowboards or water skis. The present invention provides many advantages over conventional ski construction, including reduced fabrication costs, reduced materials usage, and improved resistance to damage from activities such as tricks performed in new school skiing. The disclosed ski assembly and method produce strength and flexibility characteristics that are not achievable with conventional ski construction. Moreover, the disclosed ski core assembly and method of making the assembly are relatively simple and inexpensive compared to traditional skis and ski construction.

A typical prior-art ski construction method typically include the following sequence of steps:

Step 1: A desired ski shape is first designed, taking into account the ski's desired dimensions, flexure characteristics, stiffness, camber, materials, performance characteristics, and the like.

Step 2: A base layer is then cut to a desired shape. Pre-bent edges may be temporarily attached to, or formed in, the base layer.

Step 3: A laminated wood structure formed from elongate, relatively thick wood members laminated side-by-side is commonly used as a core material for skis. First, a plurality of wood members are laminated together to produce a core blank. A core profiler is then used to produce the desired thickness profile in the core blank to achieve the desired thickness profile along the length of the core. The profile is important for producing the desired flexure and stiffness characteristics for the final ski. The plan-form of the core is then typically shaped to match the shape of the base layer. Side walls, tip spacers, and inserts may also be formed and attached to the core during this step.

Step 4: Optionally, a shell formed typically from a composite material is prepared and cut to shape. Composites may be provided over and underneath the core.

Step 5: A top sheet may then be cut to size and provided to form a protective layer on the top of a ski.

Step 6: The prepared materials are then arranged and placed on top of a bottom mold. An adhesive, such as epoxy, is applied to glue the various layers together, and the materials and mold (top and bottom) are pressed to squeeze the materials while the epoxy cures, typically for 8-12 hours at room temperature.

Figure 1:
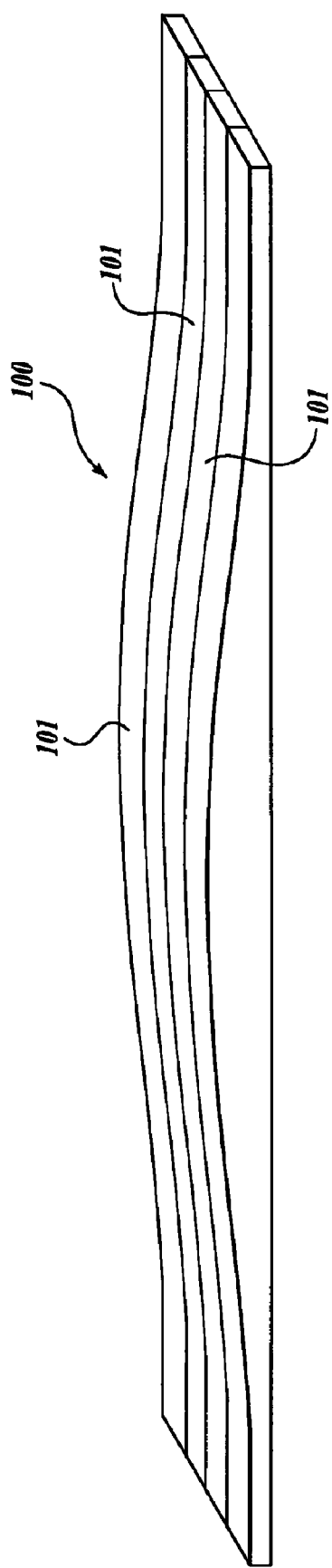
FIG. 1 shows a conventional wood ski core construction at an intermediate phase comprising a plurality of elongate wood members arranged and laminated side by side and then profiled in thickness.

FIG. 1 shows a conventional prior art wood laminate construction for a traditional ski core 100 wherein a plurality of wood members 101 all having substantially the same length, are vertically laminated, and then machined to produce a desired thickness profile, to form the core 100. The wood members are typically also shaped laterally to match the plan shape of an assembled base member with metal edges (not shown), for example, and an upper layer or shell member is produced. The assembly is laminated together to provide the basic structure of the ski, as discussed above.

In the present invention, in contrast to the conventional method of laminating relatively wide and thick wood members side by side to produce the core, the core assembly is produced by stacking and adhering a plurality of relatively thin laminating layers together. The laminating layers are preferably wood veneer or the like, but may alternatively be formed of an anisotropic composite material such as fiberglass, carbon-fiber composite, Kevlar® material, or the like. The individual layers are prepared to differing lengths, and positioned to achieve a desired thickness profile, without requiring a separate profiling step, thereby simplifying the manufacturing and reducing the amount of waste material produced.

Figure 2:
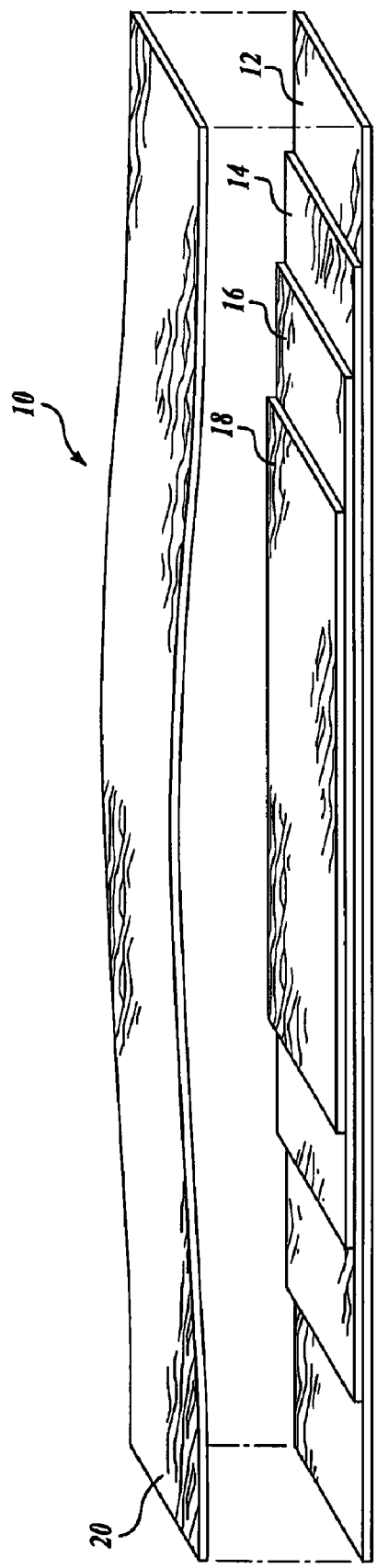
FIG. 2 illustrates a veneer laminate construction for a core assembly wherein the lengths of the individual horizontal panels or lamina are selected and positioned to produce a desired thickness-profiled core assembly without requiring a separate thickness-profiling operation.

FIG. 2 illustrates a core assembly 10 in accordance with the present invention, comprising a plurality (four shown) of horizontal wood or composite layers 12-18 of various sizes. Although four horizontal layers 12-18 are shown for illustrative purposes, it will be appreciated that many more layers may alternatively be used, and may be preferable in many applications.

The wood or composite layers 12-18 are sized and positioned prior to lamination to produce a thicker profile where greater strength and/or stiffness is desired and a thinner profile (e.g., fewer layers) where greater flexibility is desired. Typically, it is desirable that the ski be thicker, stronger and less flexible near the center, and generally taper towards the ends. A top sheet 20, which may also be formed from wood, for example, is optionally provided over the wood or composite layers 12-18 and extends over the entire length of the core assembly 10. It is contemplated that a guide, assembly jig or other tool may be used to accurately position the composite layers 12-18 in the desired locations.

Although not shown in FIG. 2, in order to better display or provide clarity of the wood or composite layers 12-18, it is contemplated that a conventional base member with metal edges, as are well known in the art, may be attached directly to the underside of the core assembly 10. It will be appreciated that the present construction does not require any type of shell structure disposed about the wood core 10.

In one exemplary embodiment, a ski made in accordance with the present invention includes a conventional base and a top sheet or layer. In this embodiment, the ski does not require a plastic top or side walls, whereby the wood layers 12-18 and the upper layer 20 of the core assembly 10 are easily visible. This provides both aesthetic advantages over prior art constructions and better inspection capabilities, whereby manufacturing flaws or damage to the core assembly 10 may be more readily ascertainable.

In the preferred method of construction, a conventional base is constructed with a desired plan form shape, and metal edges are attached in any conventional manner. Rectangular wood or composite layers 12-18 are provided in the desired lengths, and the layers 12-18 are ordered and positioned on the base to produce the desired thickness profile. The upper layer or top sheet 20 is positioned over the top. Suitable adhesives, as are well-known in the industry, are applied to the various components, which are then placed in a mold and pressed together while the adhesive cures. The wood or composite layers 12-18 and top sheet 20 are then trimmed in the laminated structure to match the plan form shape of the base.

An exemplary twin-tip ski 22 formed in accordance with the present invention, is shown in FIG. 3, with edge 24 and base 26 attached.

It will be appreciated that the present method does not require a separate step of profiling the core to achieve the desired thickness profile. In addition, the method does not require separate steps for applying a cover or side walls, thereby eliminating expensive component and construction steps, providing a relatively inexpensive ski. Nevertheless, the method provides a very rugged and solid ski construction that may be produced relatively inexpensively, and is therefore particularly suited to newschool skiing and the like.

In a preferred embodiment the layers 12-18 comprise thin rectangular panels having a width between 2 and 10 inches, and a thickness between 0.02 and 0.25 inches, the lengths of the layers 12-18 varying, as discussed above. In a particular embodiment of this new construction method, pieces of rectangular veneer, approximately five inches wide and 0.063 inches thick, are cut to varying lengths to be assembled to form a desired ski thickness profile and stiffness distribution. The veneers 12-18 are preferably laminated with grain orientation alternating by ninety degrees in neighboring layers, for example the grain direction may alternate between about zero degrees with respect to the axis and ninety degrees with respect to the major axis of the ski. This alternating orientation of the grain will make the ski less susceptible to splitting along the grain, and creates a desired aesthetic appearance to the sides of the ski, as illustrated in FIG. 3. An epoxy resin is used to laminate the stack of veneer. A traditional ski base, steel edges, fiberglass layer(s) may be additionally provided to the veneer stack. The lamination may then be accomplished in a conventional mold and press system.

In the currently preferred method, the ski is laminated with all of the layers 12-18 except the base itself being rectangular in plan form. It will be appreciated that this is different and much easier than conventional vertical laminate ski construction wherein each of the wood strips must be shaped to match thickness profile and/or sidecut shape. Once the ski is molded, the assembly is shaped to match the base sidecut in a single operation. This greatly reduces labor costs and does not require expensive top or side wall materials.

It will be readily apparent to persons of skill in the art that the present method may be accomplished using composite materials for the horizontal layers, rather than wood veneer. In particular, suitable composite materials typically have very anisotropic material properties. The present method, therefore, provides the skilled artisan with an additional method for engineering the longitudinal distribution of material properties of the ski, for example, to produce strength and flexibility characteristics that are not achievable with conventional ski construction. In particular, by suitably orienting the grain or fiber direction of the composite materials in each of the horizontal layers of the core, the designer can selectively produce desired strength and flexibility characteristics along the length of the ski.

Of course, a plastic top material may be provided over the top of the finished ski to achieve desired aesthetics and to protect the ski itself from damage.

Although the core assembly for a gliding board and the method of manufacture have been described with reference to a ski such as a newschool ski, it is contemplated that the method may similarly be applied, with minor and/or very obvious changes, to the inexpensive construction of other gliding boards such as snowboards and the like.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A ski core assembly comprising a plurality of horizontally-oriented thin panels that are sized to various desired lengths and laminated together, wherein each of the plurality of panels have a uniform thickness, and wherein the lengths and positions of the plurality of thin panels are selected to produce a desired thickness profile in the ski core assembly such that the desired thickness profile of the ski core assembly is achieved without profiling the laminated panels, wherein at least some of the plurality of thin panels are arranged in order of decreasing length from longest at the bottom to shortest at the top such that the desired thickness profile is curved with a maximum thickness at a longitudinally intermediate location.

2. The ski core assembly of claim 1, wherein the panels are formed of a wood veneer.

3. The ski core assembly of claim 1, wherein the panels are formed of an anisotropic composite material.

4. The ski core assembly of claim 1, wherein the panels are generally rectangular panels having a width between 2 and 10 inches, and a thickness not greater than 0.25 inches.

5. The ski core assembly of claim 1, wherein the panels are approximately 0.063 inches thick and extend across the entire width of the core assembly.

6. A ski comprising a ski core assembly having a plurality of horizontally-oriented thin panels that are sized to various desired lengths and laminated together, wherein each of the plurality of panels have a uniform thickness, and wherein the lengths and positions of the plurality of thin panels are selected to produce a desired thickness profile in the core assembly such that the desired thickness profile of the ski core assembly is achieved without profiling the laminated panels, wherein at least some of the plurality of thin panels are arranged in order of decreasing length from longest at the bottom to shortest at the top such that the desired thickness profile is curved with a maximum thickness at a longitudinally intermediate location, and a base that is attached to an underside of the ski core assembly.

7. The ski of claim 6, further comprising a top sheet that is positioned on top of the ski core assembly and extends along the entire length of the ski.

8. The ski of claim 6, wherein the ski core assembly panels are wood veneer panels.

9. The ski of claim 8, wherein the wood panels have a thickness not greater than 0.25 inches.

10. A method of making a ski, the method comprising:
(a) providing a base member having a desired plan form shape;
(b) providing a plurality of thin panels that are cut to various desired lengths to define a ski core assembly comprising a plurality of horizontally-oriented thin panels, wherein each of the plurality of panels have a uniform thickness;
(c) positioning the thin panels on the base member to produce a desired thickness profile, wherein at least some of the plurality of thin panels are arranged in order of decreasing length from longest at the bottom to shortest at the top such that the desired thickness profile is curved with a maximum thickness at a longitudinally intermediate location;

(d) laminating the thin panels together and to the base member, wherein the desired thickness profile of the ski core assembly is achieved without profiling the laminated panels; and (e) shaping the thin panels to conform to the base member plan form shape.

11. The method of claim 10, further comprising attaching metal edges to the base member.

12. The method of claim 11, further comprising adhering a top sheet over a top of the core assembly that extends along the entire length of the core assembly.

13. The method of claim 12, wherein the base member, horizontal layers, and top sheet are fixably attached to one another by applying an adhesive and pressing the base member, horizontal layers, and top sheet together until the adhesive has cured.

14. The method of claim 13, wherein the adhesive is an epoxy resin.

15. The method of claim 10, wherein the horizontal layers are formed of wood.

16. The method of claim 10, wherein the horizontal layers are formed of an anisotropic composite material.

17. The method of claim 10, wherein the thin panels are pieces of rectangular veneer that are about 5 inches wide and about 0.063 inches thick.

18. The method of claim 17, wherein the pieces of rectangular veneer are laminated with a grain orientation alternating by ninety degrees between adjacent layers.

* * * * *